United States Patent
Feng et al.

(10) Patent No.: US 10,168,895 B2
(45) Date of Patent: Jan. 1, 2019

(54) INPUT CONTROL ON A TOUCH-SENSITIVE SURFACE

(71) Applicant: International Business Machines Corporation, Armonk, NY (US)

(72) Inventors: Yicheng Feng, Shanghai (CN); Jun Liao, Shanghai (CN); Dan Dan Wang, Shanghai (CN); Ming Jun Xu, Madison, WI (US); Wanfei Yan, Shanghai (CN); Wen Bao Yin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 14/817,326

(22) Filed: Aug. 4, 2015

(65) Prior Publication Data
US 2017/0038957 A1 Feb. 9, 2017

(51) Int. Cl.
*G06F 3/0488* (2013.01)

(52) U.S. Cl.
CPC ........ *G06F 3/04883* (2013.01); *G06F 3/0488* (2013.01); *G06F 3/04886* (2013.01)

(58) Field of Classification Search
CPC . G06F 3/0488; G06F 3/04883; G06F 3/04886
See application file for complete search history.

(56) References Cited

U.S. PATENT DOCUMENTS

| | | | |
|---|---|---|---|
| 5,157,384 A * | 10/1992 | Greanias | G06F 3/023 345/156 |
| 8,769,431 B1 | 7/2014 | Prasad | |
| 8,902,187 B2 | 12/2014 | Han | |
| 2008/0211775 A1* | 9/2008 | Hotelling | G06F 3/0418 345/168 |
| 2009/0265670 A1* | 10/2009 | Kim | G06F 3/04883 715/863 |
| 2010/0156813 A1* | 6/2010 | Duarte | G06F 3/0488 345/173 |

(Continued)

FOREIGN PATENT DOCUMENTS

| | | |
|---|---|---|
| CN | 103530049 A | 1/2014 |
| CN | 103593136 A | 2/2014 |

(Continued)

OTHER PUBLICATIONS

Kahn, Jordan, "A look at Apple's 'Reachability' one-hand mode for larger iPhone 6 (Video)", Sep. 9, 2014, pp. 1-13, <http://9to5mac.com/2014/09/09/a-look-at-apples-reachability-one-hand-mode-for-larger-iphone-6-video/>.

(Continued)

*Primary Examiner* — William L Bashore
*Assistant Examiner* — Daniel W Parcher
(74) *Attorney, Agent, or Firm* — Edward J. Wixted, III (57) ABSTRACT

A computer-implemented method includes detecting a gesture on a touch-sensitive surface of a device, and determining whether the gesture is performed with respect to a predefined region on the touch-sensitive surface. The computer-implemented method further includes, in response to determining that the gesture is performed with respect to the predefined region, controlling an interaction focus on the touch-sensitive surface based on the gesture. A corresponding electronic device and computer program product are also disclosed.

15 Claims, 4 Drawing Sheets

(56) References Cited

U.S. PATENT DOCUMENTS

| | | | |
|---|---|---|---|
| 2011/0169749 A1* | 7/2011 | Ganey | G06F 1/1626 345/173 |
| 2011/0285631 A1* | 11/2011 | Imamura | G06F 1/1616 345/168 |
| 2013/0002573 A1* | 1/2013 | Baba | G06F 3/03547 345/173 |
| 2013/0241829 A1* | 9/2013 | Kim | G06F 3/03547 345/157 |
| 2013/0285933 A1 | 10/2013 | Sim et al. | |
| 2014/0123049 A1* | 5/2014 | Buxton | G06F 3/04883 715/773 |
| 2014/0267094 A1* | 9/2014 | Hwang | G06F 3/0488 345/173 |
| 2014/0289642 A1 | 9/2014 | Prasad | |
| 2014/0320421 A1* | 10/2014 | Wei | G06F 3/0412 345/173 |
| 2015/0153951 A1* | 6/2015 | Kim | G06F 3/0414 715/773 |
| 2016/0088060 A1* | 3/2016 | Rahman | H04L 67/025 715/740 |

FOREIGN PATENT DOCUMENTS

| | | |
|---|---|---|
| CN | 103763427 A | 4/2014 |
| CN | 104267854 A | 1/2015 |
| CN | 104281393 A | 1/2015 |
| WO | 2013189233 A2 | 12/2013 |

OTHER PUBLICATIONS

Karlson et al., "ThumbSpace: Generalized One-Handed Input for Touchscreen-Based Mobile Devices", Human-Computer Interaction Lab, Department of Computer Science, University of Maryland, College Park, MD 20742, 2007, pp. 1-15, <http://hcil2.cs.umd.edu/trs/2007-03/2007-03.pdf>.

* cited by examiner

INPUT CONTROL ON A TOUCH-SENSITIVE SURFACE

BACKGROUND

The invention relates generally to input control, and in particular to input control for electronic devices that have a touch-sensitive surface.

Input control is a significant aspect for performing interactions between a user and an electronic device, and the user may input data using various input devices such as a mouse, a joystick, and the like. As electronic devices become more compact, touch-sensitive surfaces (such as touch-sensitive screens and touchpads) become popular and turn into a major technique in the field of input control.

For a device equipped with a traditional touch-sensitive screen, a contact point between the user and the touch-sensitive screen indicates the interaction focus. Hence, the user often has to move his/her finger across the screen to perform the input at a desired location on the screen. When the size of the touch-sensitive screen is large (for example, more than 5 inches) or when the user is operating the electronic device with a single hand, it is difficult for the user to move his/her finger from one side of the screen to an opposite side across a large distance. Even if the user operates the electronic device with two hands, operating on the entire screen is sometimes not easy, for example, when the user is in motion.

SUMMARY

In one aspect, a computer-implemented method is proposed. In accordance with the method, a gesture is detected on the touch-sensitive surface. Next, whether the gesture is performed with respect to a predefined region on the touch-sensitive surface is determined, and then an interaction focus is controlled on the touch-sensitive surface based on the gesture in response to determining that the gesture is performed with respect to the predefined region.

In another aspect, an electronic device is proposed. The electronic device includes a touch-sensitive surface and one or more processing units. The one or more processing units are configured to detect a gesture on the touch-sensitive surface; determine whether the gesture is performed with respect to a predefined region on the touch-sensitive surface; and in response to determining that the gesture is performed with respect to the predefined region, control an interaction focus on the touch-sensitive surface based on the gesture.

In yet another aspect, a computer program product is proposed. The computer program product is tangibly stored on a non-transient machine readable medium and comprises executable instructions which, when executed on an electronic device, cause the electronic device to detect a gesture on the touch-sensitive surface; determine whether the gesture is performed with respect to a predefined region on the touch-sensitive surface; and in response to determining that the gesture is performed with respect to the predefined region, control an interaction focus on the touch-sensitive surface based on the gesture.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, same or similar reference numerals represent the same or similar element.

DETAILED DESCRIPTION

Principles of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
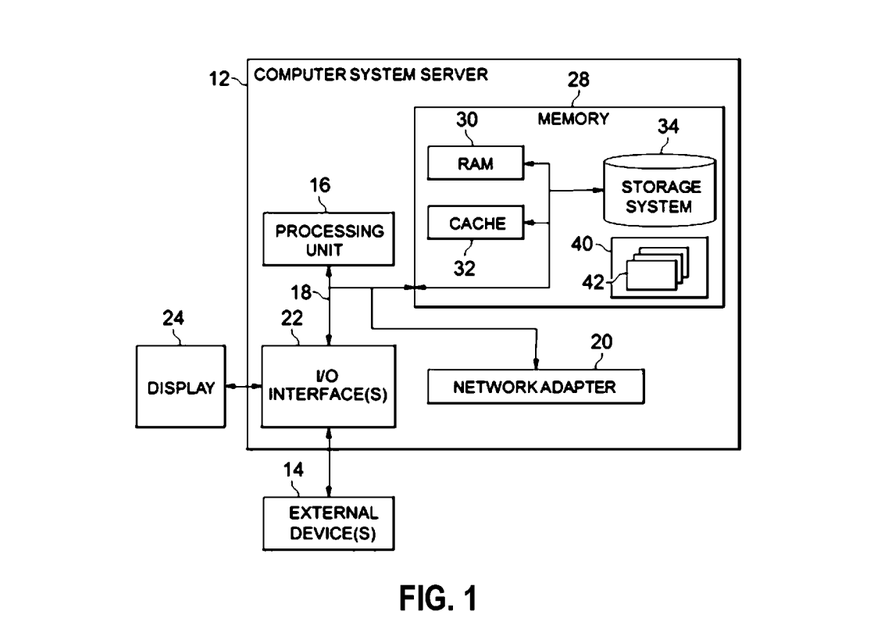
FIG. 1 illustrates a block diagram of an electronic device in which embodiments of the present invention can be implemented.

Reference is first made to FIG. 1, in which an exemplary electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose electronic device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other electronic devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Computer system/server 12 may be a mobile device in one embodiment. Examples include, but not limited to, mobile phones, laptop computers, handheld electronic devices, tablet computers, personal digital assistances (PDAs), wearable devices like electronic glasses and watches, and the like. In other embodiments, the computer system/server 12 may be a fixed device like a personal computer (PC) or any suitable digital appliance capable of sensing and processing light signals, no matter currently known or developed in the future. Although some embodiments will be discussed with reference to a mobile electronic device in the following, this is only for the purpose of illustration without suggesting any limitations as to scope of use or functionality of the present invention.

In computer system/server 12, I/O interfaces 22 may support one or more of various different input devices that can be used to provide input to computer system/server 12. For example, the input device(s) may include a user device such keyboard, keypad, touch pad, trackball, etc. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Specifically, display 24 in computer system/server 12 may include a touch-sensitive screen display. The touch-sensitive screen display at least includes a touch-sensitive screen that accepts input from the user based on haptic and/or tactile contact. The touch-sensitive screen display, along with any associated modules and/or sets of instructions in memory 28, detects contact and any movement or breaking of the contact on display 24 and converts the detected contact into interaction with user-interface objects (for example, one or more soft keys, icons, web pages or images) that are displayed on the touch-sensitive screen display. In one embodiment, a point of contact between a touch-sensitive screen display and the user corresponds to a finger of the user or an interaction tool such as a stylus.

A touch-sensitive screen display may use LCD (liquid crystal display) technology, or (Light-emitting Polymer Display) LPD technology, although other display technologies may be used in other embodiments. A touch-sensitive screen display may detect contact and any movement or breaking thereof using any of a plurality of touch sensing technologies either currently known or later developed, including, but not limited to, capacitive, resistive, infrared, and screen acoustic wave technologies, as well as other sensor arrays or other elements for determining one or more points of contact with the touch-sensitive screen display.

Moreover, in one embodiment, the touch-sensitive screen display may even be separated from the electronic device. For example, the touch-sensitive screen display may be an interactive visual display embodied on any suitable certain medium (for example, electronic material, skin, air, glass, and the like) to control one or more objects of the device.

The user may make contact with the touch-sensitive surface using any suitable object or appendage, such as a finger, a stylus, and so forth. For example, in one embodiment, the user interface is designed to work primarily with finger-based touches and gestures. The device may translate the rough finger-based input into a precise pointer/cursor position or command for performing the actions desired by the user. It is to be understood that in the context of the present disclosure, a touch input by the user does not necessarily means a physical contact. For example, for a device equipped with a proximity screen display as described above, a user can only put his/her finger(s) near the display to realize the interaction with the device.

Some approaches have been developed to facilitate input control on a touch-sensitive surface. For example, additional hardware such as a touchpad may be disposed on the electronic device to allow the user to use his/her finger to control the electronic device by various gestures on the touchpad. The additional hardware causes extra cost and weight. It is also known that a virtual touchpad may be displayed in a portion of the screen in proximity to the user's finger. The virtual touchpad may comprise a plurality of icons corresponding to operable components such as buttons and menus displayed in the screen. The user may tap the icons in the virtual touchpad so as to operate the corresponding operable components that are displayed relatively far away from the user's finger. However, the user has to remember the exact correspondence between the icons and the operable components, which will increase the user's cognitive load. It is still challenging now to allow the user to control input on a touch-sensitive surface in an efficient and friendly way.

In order to enable a user to perform input control on a touch-sensitive surface more conveniently and flexibly, embodiments of the present invention provide a method, system and related computer program product for input control on a touch-sensitive surface. Generally speaking, a touch input performed by a user is be detected on a predefined region on a touch-sensitive surface of an electronic device. Next, a gesture on a touch-sensitive surface of a device is detected. Then, whether the gesture is performed with respect to a predefined region on the touch-sensitive surface is determined; and in response to determining that the gesture is performed with respect to the predefined region, an interaction focus on the touch-sensitive surface is controlled based on the gesture.

Figure 2:
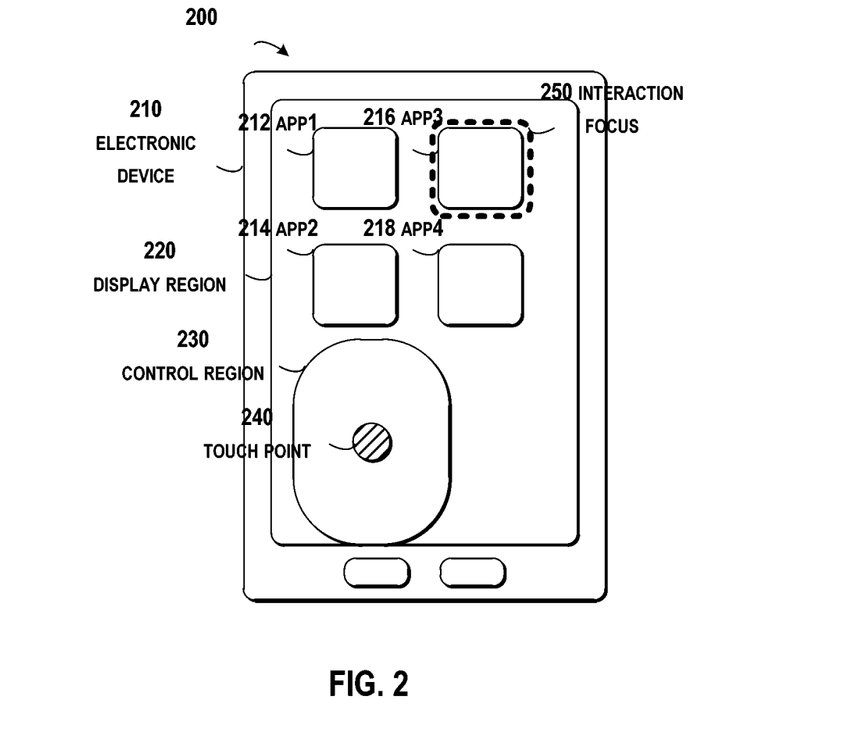
FIG. 2 illustrates a schematic view of a user interface on an electronic device with a touch-sensitive surface in accordance with one embodiment of the present invention.

FIG. 2 illustrates a schematic view of a user interface on an electronic device with a touch-sensitive surface in accordance with one embodiment of the present invention. As described above, conventionally the position of the touch input is determined as the position of the interaction focus. On contrary, in accordance with embodiments of the present invention, the position of the interaction focus may be different from the contact point of the touch input. Accordingly, an indicator showing the position of the interaction focus may be provided on the screen. The indicator may be of any suitable shape, including, but not limited to, a block, a circle, an arrow, or any other regular or irregular shape. The user may control the interaction focus based on his/her touch input on a predefined portion of the touch-sensitive surface. As this predefined portion may be a relatively small portion on the screen, the user can control the interaction focus with less movement distance of the finger. For the sake of discussion, this predefined region may be referred to as "control region" in the following description.

As shown, an electronic device 210 is equipped with a touch-sensitive surface, and a user interface may be displayed in a display region 220. The display region 220 includes a control region 230 whose size and location may be defined in advance. The control region 230 may be displayed on the screen to indicate where the touch input can be received. The user may interact with the electronic device 210 by providing touch inputs on the control region 230, for example, by his/her finger(s) or a stylus. In some embodiments, a graphical indication of the touch point 240 of the touch input may be provided. For instance, in the example shown in FIG. 2, the touch point 240 of the user's touch input is displayed as a circle within the control region 230.

An interaction focus 250 may be separate from the touch point 240. In some embodiments, the interaction focus 250 may be graphically indicated on the user interface. In the example shown in FIG. 2, the interaction focus 250 is put on an application icon "APP3" 216 and is indicated by a dashed box. It is to be understood that the graphical representations of the touch point 240 and the interaction focus 250 shown in FIG. 2 are just for the purpose of illustration, without suggesting any limitation as to the scope of the invention. Any other suitable graphical representations are possible.

As the user moves his/her finger, the touch input 240 moves and in turn the interaction focus 250 moves accordingly, for example to the application icons APP1 212, APP2 214, APP3 216, or APP4 218, or to another position on the screen. In response to other gestures detected in the control region 230, other acts may be performed, which will be discussed in further detail below. In this way, the user may control the movement of the interaction focus without any external input device. Moreover, the movement span of the touch point is limited within the control region 230, such that the user can easily control the electronic device even with a single hand.

Figure 3:
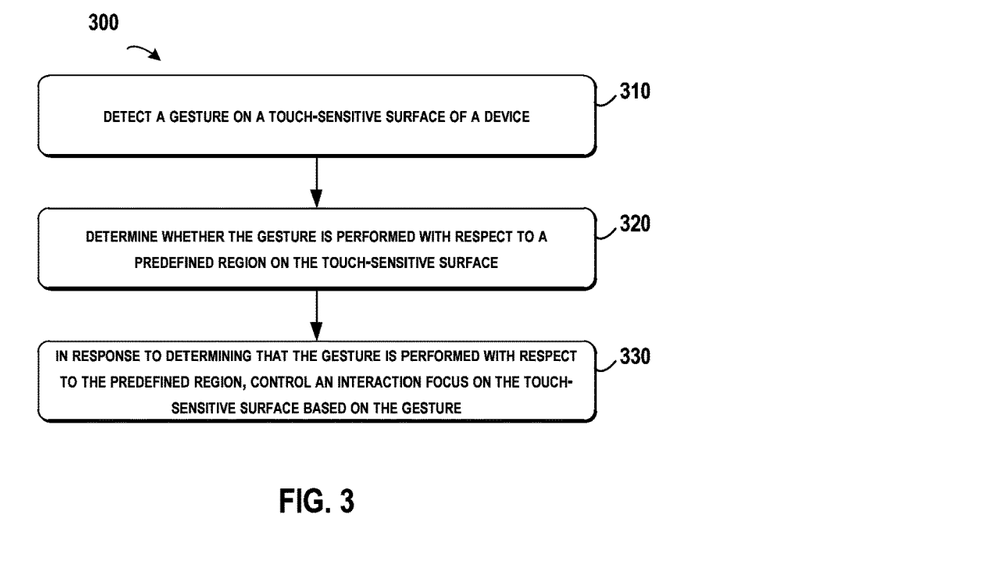
FIG. 3 is a flowchart of a method for controlling an interaction focus on an electronic device with a touch-sensitive surface in accordance with one embodiment of the present invention.

FIG. 3 is a flow chart of a method for controlling an interaction focus on an electronic device with a touch-sensitive surface in accordance with one embodiment of the present invention. As shown, in Step 310, a gesture is detected on the touch-sensitive surface. The touch-sensitive surface accepts touch inputs from the user based on haptic and/or tactile contact. The detected inputs may be converted into a touch event, for example, by the processing unit(s) in combination with the display system of the electronic device, and then the gesture of the touch input may be detected. In this embodiment, the user may perform a touch input by making contact with the touch-sensitive surface. Alternatively, when the electronic device is equipped with a proximity screen display, the user may only move his/her finger near the screen without a physical contact.

Upon detection of the user's gesture, the method 300 proceeds to step 320. In this step, whether the gesture is performed with respect to a predefined region on the touch-sensitive surface is determined. In accordance with embodiments of the present invention, a predefined region or portion of the touch-sensitive surface is provided as the control region and used for receiving the user's touch. In this step, a position of gesture is determined to check whether the gesture is performed on the predefined region. If the gesture is performed on the predefined region, then it is determined that the gesture is performed with respect to the predefined region.

In accordance with embodiments of the present invention, the control region may be of any size. For an electronic device with a small-sized screen, the control region may be the entire screen or a large portion of the screen. For an electronic device with a large-sized screen, the control region may be a small portion of the entire screen, for example, a region reachable by the user's finger. Moreover, in accordance with embodiments of the present invention, the control region may be of any suitable shape, including, but not limited to, a circle, an ellipse, a rectangle, a polygon, or any other regular or irregular shape.

In Step 330, an interaction focus is controlled on the touch-sensitive surface based on the gesture in response to determining that the gesture is performed with respect to the predefined region. For example, the user may move a finger within only a relatively small extent (for example, at the lower left corner of the screen reachable by the user's left hand, as illustrated in FIG. 2) to cause the interaction focus to move in a relatively large range.

As discussed above, in one embodiment, a graphical representation of the predefined region may be displayed on the screen. In other words, the control region may be explicitly rendered on the screen of the electronic device, such that the user may have a more intuitive sense where the control region is located.

In one embodiment, the predefined region is scalable and a dimension of the predefined region is determined based on a dimension of the touch-sensitive surface. For example, based on a length-width ratio of the touch-sensitive surface. As known, different electronic devices may have different dimensions. For example, when the user is using a cell phone with a small screen (for example, less than 4 inches), it is easy for the user to control the cell phone with a single hand. In this case, the control region may occupy a large portion of the screen. For another example, when the user is using a tablet with a large screen (for example, more than 5 inches), the control region may be scaled down to a small area to allow an easy single-hand operation. In some embodiments, the dimension/shape of the control region may be determined based on a dimension/shape of the touch-sensitive surface, such that the user can have an intuitive control on the interaction focus. For instance, in one embodiment, the length-width ratio of the control region may be proportional to the length-width ratio of the screen. By way of example, if the resolution of the screen is 1920×1080 pixels, then the control region may be defined within a region of 960×540 pixels.

In one embodiment, the interaction focus is located outside the predefined region, and the interaction focus may be moved on the touch-sensitive surface based on the gesture. For a traditional touch-sensitive surface, the touch point of the touch input from the finger indicates the interaction focus. On the contrary, according to embodiments of the present invention, the touch point of the touch input and the interaction focus may be separated and the interaction focus may be moved across the entire screen by gestures such as tap or swipe on the control region.

Figure 4:
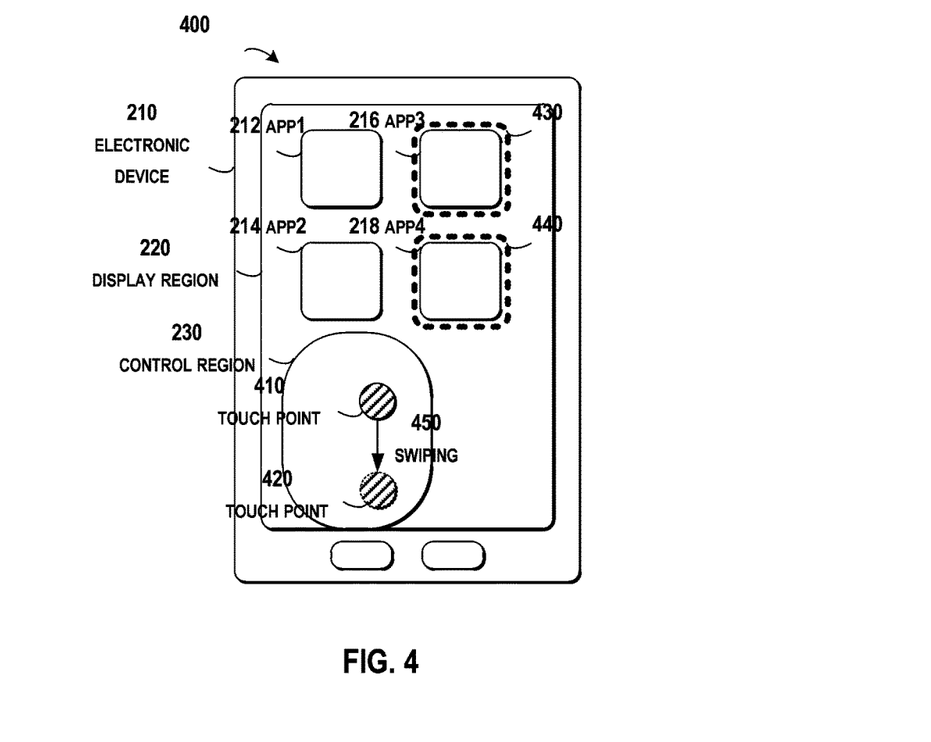
FIG. 4 illustrates a schematic view of a method for controlling an interaction focus on an electronic device with a touch-sensitive surface in accordance with one embodiment of the present invention.

In one embodiment, if the gesture is a swipe gesture on the predefined region, the interaction focus may be moved in a direction of the swipe gesture. By way of example, FIG. 4 illustrates a schematic view of the control of an interaction focus on an electronic device with a touch-sensitive surface in accordance with one embodiment of the present invention. In this example, the user swipes his/her finger downward (as show by an arrow 450). The swipe gesture 450 is defined by two touch points 410 and 420, where the touch point 410 indicates a starting position of the swipe 450 and the touch point 420 indicates an ending position of the swipe 450. In response to the gesture 450, the interaction focus moves downward to a position 440 from a previous position 430. As a result, the interaction focus is put on the application icon APP4 218 which may be highlighted. Then, if the user swipes his/her finger from right to left (not shown), the interaction focus may move left, for example, to the application icon APP2 214.

In one embodiment, the interaction focus may be moved in accordance with the movement velocity of the swipe. Specifically, a target position of the interaction focus may be determined according to the movement velocity of touch point on the screen, and then the indicator indicating the interaction focus may be refreshed at the target position. As used herein, the term "velocity" refers to the rate of movement along a certain direction. That is, the velocity of the interaction focus may be represented by a rate and a direction of movement, wherein the rate is in direct positive proportion to the movement speed of the touch point, and the movement direction of the interaction focus is the movement direction of the swipe.

It is to be understood that the example in FIG. 4 is discussed merely for the purpose of illustration of the mechanism for controlling interaction focus on a touch-sensitive surface, without suggesting any limitation as to the scope of the present invention. For example, the positions of the touch points and the interaction focus are just examples. The user may swipe on the scope of control region 230 and control the interaction focus in a manner corresponding to a movement velocity of the user's finger.

In one embodiment, a proportion factor may be set by the user to adjust a proportion relationship between the movement velocity of the interaction focus and the movement velocity of the touch point from the finger. Specifically, for an electronic device with a large screen (for example, more than 6 inches), a larger proportion factor may be defined. Hence, the user may control the interaction focus to move across the whole screen simply by performing input in a small area (for example, at the lower right corner) of the electronic device. In this way, the user does not have to swipe from one side to the other side of the screen of the electronic device. For a smaller touch-sensitive surface device, a smaller proportion factor may be suitable. For example, if the user wishes to control the movement of the interaction focus with greater sensitivity, the proportion factor may even be set to be less than 1.

Figure 5:
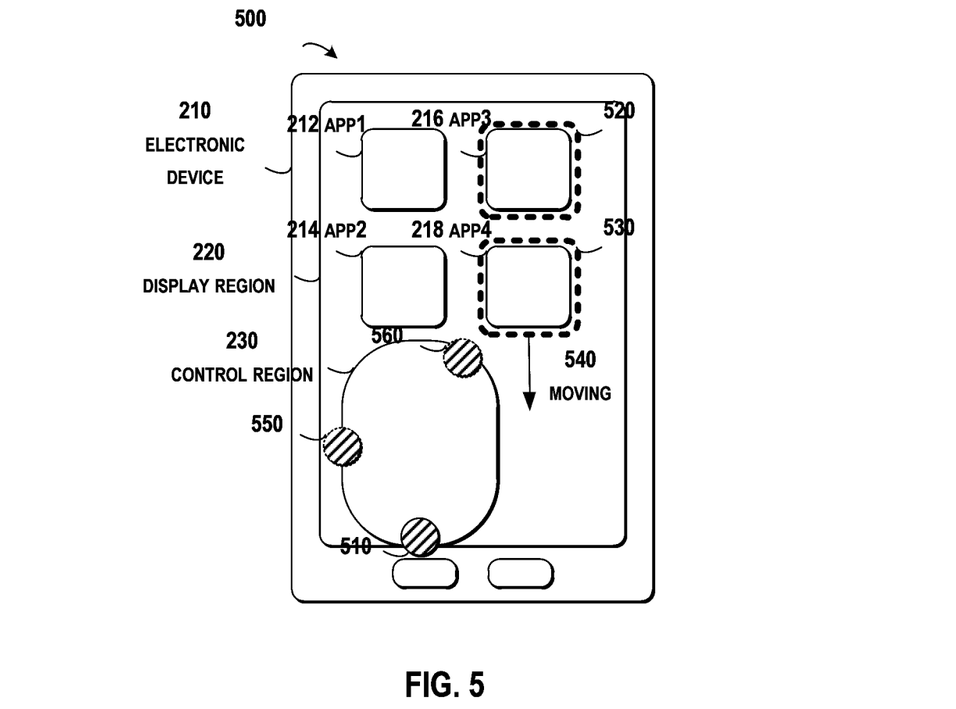
FIG. 5 illustrates a schematic view of a method for controlling an interaction focus on an electronic device with a touch-sensitive surface in accordance with one embodiment of the present invention.

It should be appreciated that for a large-sized screen, the user might have to swipe repeatedly within the control region so as to implement a long-distance movement of the interaction focus, for example, from a corner of the screen to another corner along a diagonal of the screen. To deal with this situation, in some embodiments, a gesture may be defined to enable the fast movement of the interaction focus. For example, in one embodiment, if a tap gesture is detected on a boundary of the predefined region, the interaction focus may be moved along a direction from a center of the predefined region to a position of the touch point. FIG. 5 illustrates a schematic view of such an example.

As shown, when the user puts his/her finger at a position 510 on the boundary of the control region 230, the interaction focus may move down from an original position 520 to a target position 530 along the direction from the center of the predefined region to the position of the touch input. In FIG. 5, the interaction focus may move along the direction illustrated by an arrow 540. For another example, if the user puts his/her finger at a position 550 on the boundary of control region 230, the interaction focus may move from right to left because the position 550 and the center of the control region 230 defines a direction from right to left. In this situation, the interaction focus may move left and highlight APP 2 214. Further, if the user puts his/her finger at a position 560, the interaction focus may move in a diagonal direction. At this point, the interaction focus may move from APP2 214 to APP 3 216.

In one embodiment, if the touch input is a physical contact, the touch force may be considered in controlling the movement of the interaction focus. In daily usage, the greater touch force on the touch-sensitive surface, the faster the user desires the interaction focus to move. In one embodiment, the movement velocity of the interaction focus may be in direct proportion to the touch force. In other words, the greater the touch force is, the faster the interaction focus moves; on the contrary, the smaller the touch force is, the more slowly the interaction focus moves. In one embodiment, the touch force may be determined using a pressure sensor(s) on the screen. Alternatively, or in addition, the touch force may be calculated based on a contact area of the user's finger on the screen.

More particularly, some electronic devices are equipped with a pressure sensor(s) capable of measuring the touch force on the touch-sensitive surface. For such electronic devices, the pressure sensor may be used to measure the touch force, which then can be used as a parameter for controlling a movement speed of the interaction focus. For those electronic devices without pressure sensors, the touch force may be determined based on an assumption that the touch force is proportional to the contact area on the screen.

In one embodiment, the gesture detected in the control region may be further used to control an application component in focus. That is, in addition to the control of movement of the interaction focus, embodiments of the present invention further allow the user to control the application component in focus by the gesture on the control region. As used herein, the application component in focus refers to the application component on which the interaction focus is currently put on.

For example, in some embodiments, if a tap gesture is detected at a center of the predefined region, the application component in focus may be launched to execute on the electronic device. In one embodiment, if the user stops his/her finger at the center of the control region, the application component in focus may be triggered. Referring back to FIG. 2, the touch point 240 indicated by the user's finger is located at the center of the control region 230. In response, APP3 216 which is now in focus may be started. In such embodiment, a tap at the center of the control region 230 is functionally similar to a direct tap on APP3 216.

In the above paragraphs, an application is described as an example of the "application component." Alternatively, in other embodiments, the "component" may be various objects displayed on the screen, such as a link, a button, a list, a check box, and the like. For example, after the user moves the interaction focus to a desired position, he/she may tap the center of the control region with his/her finger, to achieve the same effect as directly tapping on the component. As an example, if the interaction focus is located onto a URL (Uniform Resource Locator) displayed in a webpage, the user may tap the center of the control region to open the webpage indicated by the URL. As another example, if the interaction focus is put on a button, the tap at the center of the control region triggers a click on the button.

It should be appreciated that although the above paragraph describes tapping the center of the control region, this is only for the purpose of illustration without suggesting any limitations as to the scope of the present invention. For example, additionally or alternatively, the control region may be divided into a plurality of areas. In such embodiments, taps on different areas may trigger different operations such as exiting the application, switching to another application, and the like.

Sometimes, the user needs to perform complex operations on the touch-sensitive surface. For example, an alarm application may include components for selecting "date" and "time." The component for "date" may further comprise three scroll wheels for selecting "year," "month," and "day," while the component for "time" may further comprise scroll wheels for selecting "hour," "minute," and "second." The above situation of creating the alarm is just an example of performing complex operations. For those applications including lots of components such as buttons and/or menus, it is usually difficult for the user to operate on a desired component separately.

Figure 6:
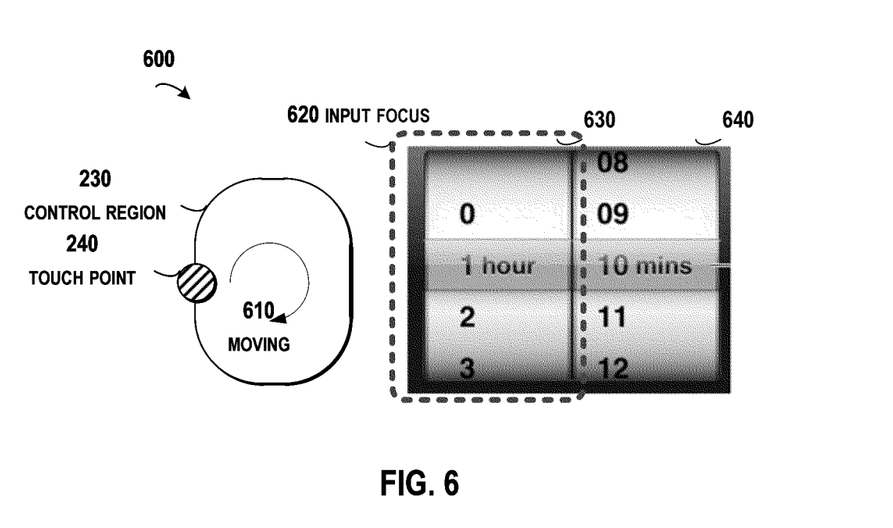
FIG. 6 illustrates a schematic view of a method for controlling an interaction focus on an electronic device with a touch-sensitive surface in accordance with one embodiment of the present invention.

In some embodiments, a gesture may be designed in order to enable separate control of components. For example, in one embodiment, if the device detects a circling gesture on a boundary of the predefined region in a certain direction, the application component in focus may be activated while other application components may be deactivated. FIG. 6 illustrates a schematic view of such an example.

In the example shown in FIG. 6, an interaction focus 620 highlights the scroll wheel 630 for selecting "hour" in an alarm application. If the user moves his/her finger on the boundary of the control region 230 in a first direction (for example, clockwise) as indicated by an arrow 610, the scroll wheel 630 for selecting "hour" may be "locked." In other words, in response to the touch input 240 moving around the control region 230, the scroll wheel 630 for "hour" on the left may be activated and the scroll wheel 640 for "minute" on the right may be deactivated. Then, all the gestures detected after the circling gesture on the control region 230 will be interpreted as inputs for controlling only the rotation of the scroll wheel "hour." At this point, the scroll wheel 630 may rotate in accordance with the user's swipe within the control region 230. Although only one scroll wheel 640 is deactivated in FIG. 6, this is merely for purpose of illustration. If the alarm comprises individual scroll wheels for "year," "month," "day," "hour," "minute," and "second," all the other scroll wheels except the one for "hour" may be deactivated.

When the user finishes his/her operations to the activated component, he/she may unlock the highlighted component by an "exit" gesture. For example, in some embodiments, if the device detects a circling gesture on the boundary of the predefined region in a second direction which is different from the first direction, the deactivated application component may be activated. Still in reference to the example in FIG. 6, the user may move his/her finger on the boundary of the control region 230 in the second direction which is counterclockwise in this case. In response, the deactivated scroll wheel 640 will be activated again.

As described above, in some embodiments, the graphical representation of the predefined region may be displayed in such a place on the screen that the user can easily reach it with his/her finger. The user may specify a location of the control region according to his/her preference, for example. For instance, if the user is a left-hander, the location of the control region may be at the lower left corner of the screen.

In one embodiment, the position of the graphical representation may be changed based on positions of a plurality of previous touch inputs on the touch-sensitive surface. That is, in order to facilitate the user's operation, the position of the control region may be determined from the distribution of the user's previous touch inputs. It is supposed that the user holds a cell phone by the left hand and operates the device with his/her left thumb. Accordingly, the positions of user's previous touch inputs may be arranged in the lower left part of the screen.

Figure 7:
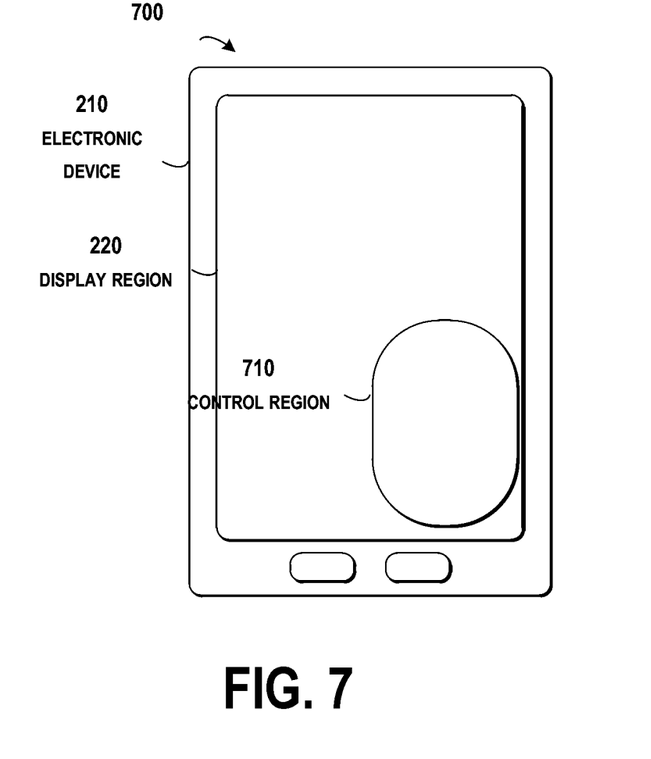
FIG. 7 illustrates a schematic view of a method displaying a graphical representation of a predefined region on an electronic device with a touch-sensitive surface in accordance with one embodiment of the present invention.

Later it is supposed that the user changes the cell phone to his/her right hand. It is hard for the user to operate the cell phone with his/her right thumb if the control region still locates at the lower left corner of the screen. In this situation, positions of the touch inputs from the right thumb may move to the lower right corner of the screen. FIG. 7 illustrates a schematic view of such an example. As shown, after the user changes the cell phone to the right hand, the device may detect that the touch inputs concentrate on the right part of the screen. In response, the position of the graphical representation of the predefined region may be moved to the lower right of the screen.

In one embodiment, the predefined region may be an ellipse. As discussed above, the control region is an area for the user to perform touch input. In view of the fact that an ellipse may depict the reachable area of the thumb, defining the control region as an ellipse may provide more friendly experience to the user.

By means of the technical solution described above, a new input control mode is proposed. Upon entering the new mode, the interaction focus may be displayed, for example, initially at the center of the screen, and may be moved to any desired position by the user's gesture on the control region. In this situation, when the user contacts the control region, the interaction focus may be driven by the user's gesture on the control region; moreover, the control region may act as a "virtual touchpad" for controlling the interaction focus. In this way, when the user's finger cannot reach the whole screen area, it is possible to move the interaction focus to any desired location by the movement of the finger on the control region. It should be appreciated that "the new input control mode" and "the new mode" mentioned in the context of the present invention refer to an operation mode relative to a "traditional mode (a normal operation mode of the touch-sensitive surface)." By means of this technical solution, the user's reliance on a dedicated input device may be reduced on the one hand; and on the other hand, convenience is provided to control the electronic device with one hand.

In one embodiment, the new input control mode in accordance with the present invention may provide an additional/alternative mode for input control on the touch-sensitive surface. For example, the new mode and the traditional mode may run in parallel. In other words, when the user's touch input is on the control region, the input control may be implemented in accordance with embodiments of the present invention; and when the user's touch input is outside the control region, the input control may be implemented in accordance with the traditional mode. In another embodiment, the new mode may replace the traditional mode. In this situation, the input control of the present invention may disable the traditional mode, and thus touch input outside the control region may be omitted.

In one embodiment, the new mode is initiated in many ways, for example, if the track of the touch input satisfies a first predefined track or a first predefined button, then the new mode is initiated. The user may use various manners for entering the new mode. In one embodiment, the user may touch the surface of the screen in the traditional mode, and if the track of the touch input satisfies a predefined track (e.g., a circle, a triangle or other predefined shape), the electronic device then enters the new mode. In this embodiment, techniques such as motion track analysis may be used to compare whether the track inputted by the user is matched to the predefined track, which is not detailed in this specification. In the new mode, the indicator of the interaction focus may be displayed, and the user's touch to the touch-sensitive surface may be used as an input for controlling the interaction focus.

In one embodiment, the electronic device may enter the new mode if the interaction focus moves out of the control region. The interaction focus's moving out of the control region may indicate that the user has to move a relative large distance to control the interaction focus in the traditional mode. This situation may trigger entering into the new mode, such that the new mode may provide more friendly experience to the user.

In the context of the present invention, the interaction focus is a sign specific to the new mode. When the electronic device exits the new mode, an operating state of the electronic device is restored to the traditional mode, at which point the interaction focus is not displayed and the interaction focus becomes the touch point of the user's finger.

In one embodiment, exiting the new mode may be triggered if the track of the touch point satisfies a second predefined track, or if a second predefined button exiting the new mode is pressed. The operation of exiting the new mode is similar to the above-described operation of entering the new mode. In addition to the above, it is possible to exit the new mode in response to the fact that the touch-sensitive surface has not been touched for a predetermined period of time. The basis of using this exiting approach is that when the user has not touched the screen for a predetermined time, in other words, the user has not changed a location of the interaction focus for a predetermined time, the user has moved the interaction focus to a different location. Hence, it is possible to exit the new mode after a predetermined period of time. For example, the user may customize duration of the predetermined time period to 1 minute, 2 minutes, etc.

In another embodiment, the electronic device may exit the new mode if the interaction focus moves into the control region. The interaction focus's moving into the control region may indicate that the user may easily control the interaction focus in the traditional mode. This situation may trigger exiting the new mode and returning to the traditional mode.

It is to be understood that the above example embodiments are described only for the purpose of illustration, without suggesting any limitations as to the scope of the present invention. Based on the principle described above, those skilled in the art may work out other technical solutions for input control on the touch-sensitive surface.

In accordance with one embodiment of the present invention, there is proposed an electronic device. The electronic device comprises a touch-sensitive surface and at least one processing unit. The at least one processing unit is configured for detecting a gesture on a touch-sensitive surface of a device; determining whether the gesture is performed with respect to a predefined region on the touch-sensitive surface; and in response to determining that the gesture is performed with respect to the predefined region, controling an interaction focus on the touch-sensitive surface based on the gesture.

In one embodiment, the at least one processing unit is further configured to display a graphical representation of the predefined region, wherein a dimension of the predefined region is determined based on a dimension of the touch-sensitive surface. In one embodiment, the at least one processing unit is further configured to perform at least one step selected from the group consisting of: (i) moving the interaction focus on the touch-sensitive surface based on the gesture; and (ii) operating an application component based on the gesture, the interaction focus being put on the application component.

In one embodiment, the interaction focus is located outside the predefined region. In this embodiment, the at least one processing unit is further configured to perform at least one step selected from the group consisting of: (i) in response to the gesture being a swipe gesture, moving the interaction focus according to a direction of the swipe gesture; and (ii) in response to the gesture being a tap gesture on a boundary of the predefined region, moving the interaction focus according to a direction from a center of the predefined region to a position of the tap.

In one embodiment, wherein the at least one processing unit is further configured to perform at least one step selected from the group consisting of: (i) in response to the gesture being a tap gesture at a center of the predefined region, launch the application component on the device; and (ii) in response to the gesture being a circling gesture on a boundary of the predefined region in a first direction, activate the application component and deactivate another application component other than the application component. In one embodiment, the at least one processing unit is further configured to, in response to the gesture being a circling gesture on the boundary of the predefined region in a second direction, activate the other application component, the second direction is different from the first direction.

In one embodiment, the at least one processing unit is further configured to arrange the graphical representation of the predefined region within a reachable area of a finger of a user performing the gesture. In one embodiment, the at least one processing unit is further configured to change a position of the graphical representation based on positions of a plurality of previous touch inputs on the touch-sensitive surface. In one embodiment, the predefined region is an ellipse.

In accordance with one embodiment of the present invention, there is proposed a computer program product being tangibly stored on a non-transient machine-readable medium and comprising machine-executable instructions, the instructions, when executed on an electronic device, causing the electronic device to: detect a gesture on a touch-sensitive surface of a device; determine whether the gesture is performed with respect to a predefined region on the touch-sensitive surface; and in response to determining that the gesture is performed with respect to the predefined region, control an interaction focus on the touch-sensitive surface based on the gesture.

In one embodiment, the instructions further cause the electronic device to display a graphical representation of the predefined region, wherein a dimension of the predefined region is determined based on a dimension of the touch-sensitive surface. In one embodiment, the interaction focus is located outside the predefined region.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying, by one or more processors, an area on a touch-sensitive surface of a device corresponding to a concentration of received touch inputs on the touch-sensitive surface;
   displaying, by one or more processors, a graphical representation of a predefined region at the area;
   detecting, by one or more processors, a gesture on the touch-sensitive surface of a device;
   determining, by one or more processors, whether the gesture is performed with respect to the predefined region on the touch-sensitive surface; and
   in response to determining that the gesture is performed with respect to the predefined region, controlling, by one or more processors, an interaction focus on the touch-sensitive surface based on the gesture, wherein:
   the interaction focus is located outside the predefined region; and
   controlling the interaction focus on the touch-sensitive surface based on the gesture comprises:
   moving, by one or more processors, the interaction focus on the touch-sensitive surface based on the gesture; and
   operating, by one or more processors, a scroll wheel based on the gesture, the interaction focus being put on the scroll wheel, wherein operating the scroll wheel comprises:
   in response to the gesture being a circling gesture on a boundary of the predefined region in a first direction, locking, by one or more processors, the interaction focus on the scroll wheel; and
   in response to receiving a subsequent gesture with respect to the predefined region, rotating, by one or more processors, the scroll wheel.

2. The method of claim 1, wherein a dimension of the predefined region is determined based on a dimension of the touch-sensitive surface.

3. The method of claim 1, wherein moving the interaction focus on the touch-sensitive surface comprises:
   in response to the gesture being a tap gesture on a boundary of the predefined region, moving, by one or more processors, the interaction focus according to a direction from a center of the predefined region to a position of the tap.

4. The method of claim 1, wherein displaying the graphical representation of the predefined region comprises:
   arranging, by one or more processors, the graphical representation of the predefined region within a reachable area of a finger of a user performing the gesture.

5. The method of claim 1, further comprising:
   identifying, by one or more processors, a second area of the touch-sensitive surface of the device corresponding to a second concentration of subsequently received touch inputs on the touch-sensitive surface;
   moving, by one or more processors, a position of the graphical representation of the predefined region to the second area.

6. The method of claim 1, wherein the predefined region is an ellipse.

7. An electronic device comprising:
   a touch-sensitive surface; and
   at least one processing unit configured to:
   identify an area on the touch-sensitive surface corresponding to a concentration of received touch inputs on the touch-sensitive surface;
   display a graphical representation of a predefined region at the area;
   detect a gesture on the touch-sensitive surface;
   determine whether the gesture is performed with respect to the predefined region on the touch-sensitive surface; and
   in response to determining that the gesture is performed with respect to the predefined region, control an interaction focus on the touch-sensitive surface based on the gesture, wherein:
   the interaction focus is located outside the predefined region; and
   controlling the interaction focus on the touch-sensitive surface based on the gesture comprises:
   moving the interaction focus on the touch-sensitive surface based on the gesture; and
   operating a scroll wheel based on the gesture, the interaction focus being put on the scroll wheel, wherein operating the scroll wheel comprises:
   in response to the gesture being a circling gesture on a boundary of the predefined region in a first direction, locking the interaction focus on the scroll wheel; and in response to receiving a subsequent gesture with respect to the predefined region, rotating the scroll wheel.

8. The electronic device of claim 7, wherein a dimension of the predefined region is determined based on a dimension of the touch-sensitive surface.

9. The electronic device of claim 7, wherein the at least one processing unit is further configured to perform the step of:
in response to the gesture being a tap gesture on a boundary of the predefined region, moving the interaction focus according to a direction from a center of the predefined region to a position of the tap.

10. The electronic device of claim 7, wherein the at least one processing unit is further configured to:
in response to the gesture being a circling gesture on the boundary of the predefined region in a second direction, unlock the interaction focus with respect to the application component, the second direction being different from the first direction.

11. The electronic device of claim 7, wherein the at least one processing unit is further configured to:
arrange the graphical representation of the predefined region within a reachable area of a finger of a user performing the gesture.

12. The electronic device of claim 7, wherein the at least one processing unit is further configured to:
identify a second area of the touch-sensitive surface corresponding to a second concentration of subsequently received touch inputs on the touch-sensitive surface;
move a position of the graphical representation of the predefined region to the second area.

13. The electronic device of claim 7, wherein the predefined region is an ellipse.

14. A computer program product being tangibly stored on a non-transient machine-readable medium and comprising machine-executable instructions, the instructions, when executed on an electronic device, causing the electronic device to:
identify an area on the touch-sensitive surface corresponding to a concentration of received touch inputs on the touch-sensitive surface;
display a graphical representation of a predefined region at the area;
detect a gesture on the touch-sensitive surface;
determine whether the gesture is performed with respect to the predefined region on the touch-sensitive surface; and
in response to determining that the gesture is performed with respect to the predefined region, control an interaction focus on the touch-sensitive surface based on the gesture, wherein:
the interaction focus is located outside the predefined region; and
controlling the interaction focus on the touch-sensitive surface based on the gesture comprises:
moving the interaction focus on the touch-sensitive surface based on the gesture; and
operating a scroll wheel based on the gesture, the interaction focus being put on the scroll wheel, wherein operating the scroll wheel comprises:
in response to the gesture being a circling gesture on a boundary of the predefined region in a first direction, locking the interaction focus on the scroll wheel; and
in response to receiving a subsequent gesture with respect to the predefined region, rotating the scroll wheel.

15. The computer program product of claim 14, wherein a dimension of the predefined region is determined based on a dimension of the touch-sensitive surface.

* * * * *